United States Patent [19]

Lebrun

[11] 4,413,321

[45] * Nov. 1, 1983

[54] RAPID DETECTOR OF A WIND GRADIENT

[75] Inventor: Jean L. Lebrun, Antony, France

[73] Assignee: Societe Francaise d'Equipements pour la Navigation Aerienne S.F.E.N.A., France

[ * ] Notice: The portion of the term of this patent subsequent to Jul. 28, 1998, has been disclaimed.

[21] Appl. No.: 185,915

[22] PCT Filed: May 7, 1979

[86] PCT No.: PCT/FR79/00040

§ 371 Date: Jan. 7, 1980

§ 102(e) Date: Jan. 7, 1980

[87] PCT Pub. No.: WO79/01039

PCT Pub. Date: Nov. 29, 1979

Related U.S. Application Data

[63] Continuation-in-part of Ser. No. 79,517, Sep. 27, 1979, Pat. No. 4,281,383, which is a continuation of Ser. No. 750,245, Dec. 13, 1976, abandoned.

[30] Foreign Application Priority Data

May 8, 1978 [FR] France .................... 78 13515

[51] Int. Cl.³ .................................... G06G 7/70
[52] U.S. Cl. ........................ 364/428; 244/181; 244/183; 364/434
[58] Field of Search ............. 364/428, 434, 435; 340/27 R, 27 SS; 73/178 R, 178 T; 244/181–186, 194

[56] References Cited

U.S. PATENT DOCUMENTS

| | | | |
|---|---|---|---|
| 3,265,333 | 8/1966 | Montooth | 364/428 X |
| 3,379,396 | 4/1968 | Patterson | 244/181 |
| 3,510,090 | 5/1970 | Falkner et al. | 244/180 |
| 3,614,036 | 10/1971 | Foster | 244/182 |
| 3,618,002 | 11/1971 | Stinson | 340/27 R |
| 3,686,626 | 8/1972 | Bateman et al. | 364/428 X |
| 3,814,912 | 6/1974 | Manke et al. | 364/428 |
| 3,840,200 | 10/1974 | Lambregts | 244/182 |
| 4,012,713 | 3/1977 | Greene et al. | 340/27 R |
| 4,021,010 | 5/1977 | Bliss | 244/182 |
| 4,281,383 | 7/1981 | LeBrun | 364/428 |

Primary Examiner—Jerry Smith
Attorney, Agent, or Firm—Scully, Scott, Murphy & Presser

[57] ABSTRACT

The invention concerns a process for the rapid detection of a wind gradient.

This process utilizes the relationship existing between the aerodynamic slope γa, the total slope $\gamma_T$ and the anemometric speed V, relation being able to be in the form $$(\gamma_T - \gamma_a) g - \frac{s(V - V_{sel})}{1 + 0.2s} = A$$

in which s is the Laplace operator, A is a value which is substantially constant or zero, in the case of a normal flight without disturbances, and which increases in the case of a wind gradient, wind forward becoming wind behind, the Vsel is an assigned value. This value A is mixed with a value representative of the capacity of the aircraft to overcome a wind gradient, so as to obtain a composite signal compared to a value of reference.

The invention can be utilized at the moment of the phase of approach of an aircraft.

4 Claims, 6 Drawing Figures

RAPID DETECTOR OF A WIND GRADIENT

This patent application is a continuation-in-part of U.S. patent application Ser. No. 079,517, filed Sept. 27, 1979, now issued as U.S. Pat. No. 4,281,383, which was a continuation of application Ser. No. 750,245, filed Dec. 13, 1976, now abandoned.

The present invention concerns improvements in the process and in the system for the rapid detection of a wind gradient according to U.S. Pat. No. 4,281,383.

One will recall that the process according to the principal patent utilizes, for the detection of wind gradients, the relationship existing between the aerodynamic slope $\gamma$ a, the total slope $\gamma_T$ and the anemometric speed V, this relationship being expressed;

$$(\gamma_T - \gamma_a)g - \frac{s(V - Vsel)}{1 + 0.2s} = A$$

In this formula, g is the acceleration of gravity, s is the Laplace operator, Vsel is an assigned speed and A is a value which is substantially constant or zero, in the case of normal flight without disturbances, and which increases in the case of a gradient of wind, wind changing direction.

This process consists more particularly in detecting the variations of the magnitude A and delivering a warning signal when this value rises above a predetermined threshold.

It has been thought at first to attribute to this threshold a fixed value.

Such a solution presents, however, the drawback of not taking into account the ability of the aircraft to overcome the disturbances caused by the wind gradient.

The invention has therefore, from the outset, an object of eliminating this drawback. It proposes, to this effect, the improvement which consists, instead of comparing the value A to a fixed or variable reference value, to mixing this value A with a value representative of the capacity of the aircraft to overcome the wind gradient, in such a way as to obtain a composite signal which is compared to a reference value.

According to one feature of the invention, the value representative of the capacity of the aircraft to overcome the gradient of wind is the value of the incidence $\alpha$ of the aircraft, the value of the reference then being related to this incidence.

The invention has moreover for its purpose a process for the rapid detection of a wind gradient utilizing in the calculation the magnitude A, instead of the parameters $\gamma$ a and $\gamma_T$ as previously defined, the information thereon being supplied by an inertial guidance unit.

In order to achieve this goal, the invention proposes to obtain the magnitude A by effecting the derivative in relation to time of the difference between the speed V, supplied by a central anemometric unit, and the ground speed $V_x$, detected by the inertial guidance unit.

Some embodiments of the invention will be described hereafter as non-limiting examples, with reference to the annexed drawings in which.

Figure 1:
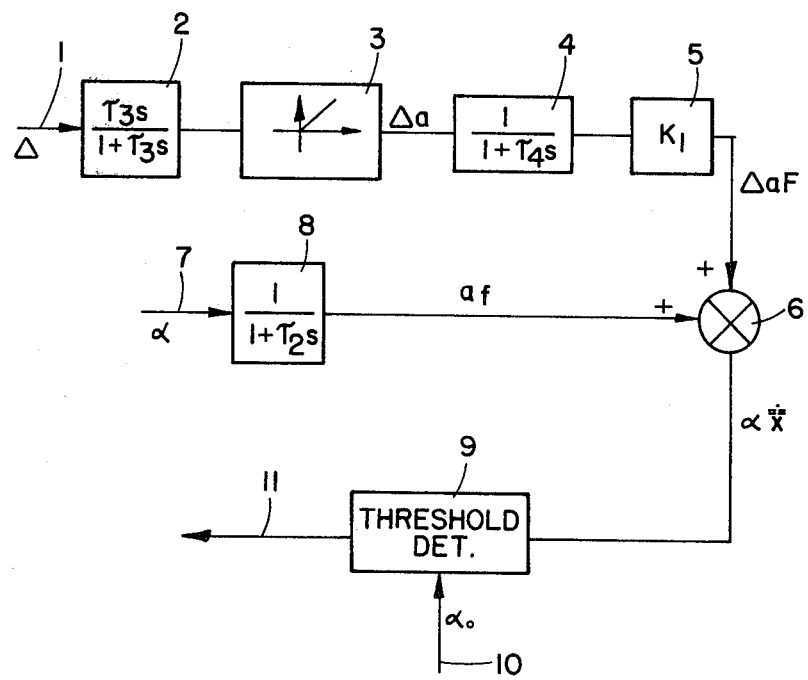
FIG. 1 is a block-diagram for a detection system for a gradient of wind, taking into account the present incidence of the aircraft, in the case where the magnitude A is calculated with the help of the parameters $\gamma$ a and $\gamma_T$.

With reference to FIG. 1, the signal representative of the magnitude A which can be furnished (arrow 1) by a circuit solving the equation:

$$A = (\gamma_T - \gamma_a)g - s\frac{(V - Vsel)}{1 + 0.2s}$$

is first transmitted to a filter 2 of the transfer function in the form $$\frac{\tau_3 s}{1 + \tau_3 s}$$

which serves to avoid instrument errors (in particular those which serve for the determination of $\gamma_T$ and of $\gamma$ a ) and which is sensitive to the change of direction of the magnitude A.

This filter 2 is itself connected to a directional circuit conductor 3 such as a diode whose function is to transmit only the signals (generally positive) corresponding to dangerous wind gradients being expressed by a sharp reduction in the anemometric speed of the airplane.

The signal $$\Delta a = \left[ \frac{\tau_3 s}{1 + \tau_3 s} A \right] \geq 0$$

supplied by this circuit 3 is transmitted to a filter 4 whose transfer function is in the form $$\frac{1}{1 + \tau_4 s},$$

which makes it possible to eliminate the disturbances so as to avoid untimely alarms.

This filter 4 is connected to an amplifier 5 of gain $K_1$, which serves to make the signal, which is related to or a function of knots/second, homogeneous to a signal of incidence expressed in degrees.

The signal $\Delta \alpha_F$ furnished by this filter is next transmitted to an adder 6, which receives a signal $\alpha_f$ representative of the incidence $\alpha$ (arrow 7) of the aircraft emanating from a detector of incidence associated with a filter 8 of the transfer function $$\frac{1}{1 + \tau_2 s}.$$

By way of an indicating example, the constants of time $\tau_2$, $\tau_3$ and $\tau_4$ can be equal to three seconds, as far as $\tau_2$ and $\tau_4$ are concerned, and to ten seconds concerning $\tau_3$.

The signal $\alpha \overline{X} = \alpha_f + \Delta \alpha_F$, supplied by the adder 6, is transmitted to an amplitude/threshold detector 9, which compares the signal $a\vec{\bar{X}}$ to a signal $a_o$ of reference (arrow 10) and which transmits an alarm signal (arrow 11) when $a\vec{\bar{X}}$ becomes superior to $a_o$.

Figures 4, 5, 6:
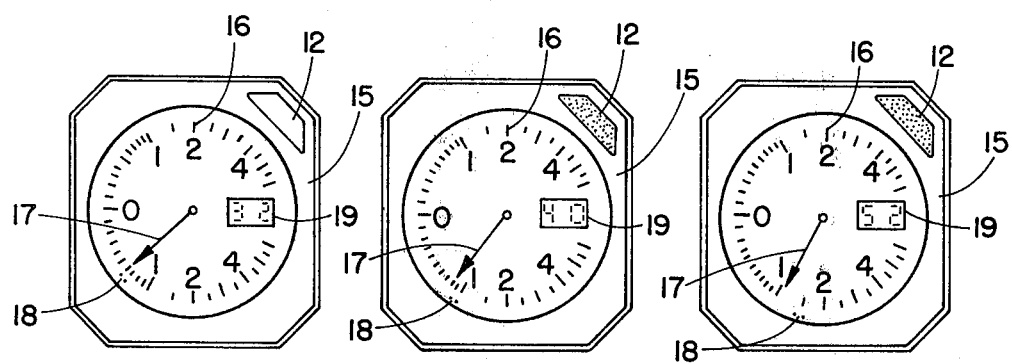
FIGS. 4, 5 and 6 represent schematically a variometer equipped with a luminous signal of alarm of a rapid detection system of a wind gradient, the indications supplied by this improved variometer corresponding respectively to the three principal phases of the wind gradient.

This signal of alarm can notably cause the lighting up of a luminous signal 12 disposed on the dial of an improved variometer, as represented in FIGS. 4, 5 and 6.

Figure 2:
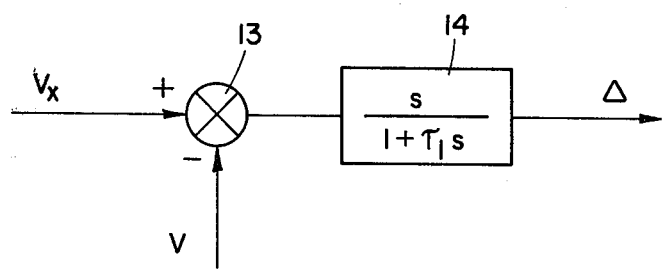
FIG. 2 is a block-diagram of a circuit allowing the working out of the magnitude A, with the help of information supplied by an inertial guidance unit.

With reference to FIG. 2, in the case where the aircraft is equipped with an inertial guidance unit or any other device capable of generating or indicating the ground speed, the magnitude A can be calculated no longer from the formula:

$$(\gamma_T - \gamma_a)g - s\frac{(V - Vsel)}{1 + 0.2s} = A$$

but from the ground speed $V_x$ and from the aerodynamic speed V issued for example by a central anemometric unit.

A circuit for performing such a calculation comprises a subtractor 13 effecting the difference $V_x - V$ and a derivative 14 of the transfer function $$\frac{s}{1 + \tau_1 s}$$

provided at the output of this subtractor. The magnitude A obtained is then in the form:

$$A = \frac{s}{1 + \tau_1 s}(V_x - V).$$

In the case where such a circuit is utilized for the determination of the magnitude A, its linking up to the circuit represented by FIG. 1 is effected directly on the directional circuit conductor 3, in leaving out the filter 2 of the transfer function $$\frac{\tau_3 s}{1 + \tau_3 s}.$$

In order to allow the pilot to know instantaneously the maneuverings that he has to effect to overcome the effects of a wind gradient, and this, from the moment when the alarm signal is emitted by the system of detection of a wind gradient, the invention proposes, as previously indicated, to use, as an alarm signal, a luminous signal generated by a luminous signal 12 associated with an improved variometer comprising (FIGS. 4, 5 and 6):

dial 15 involving, in a conventional way, a graduation 16 representative of a vertical speed;

a needle 17 indicating on the said graduation the instantaneous vertical speed $h\vec{\bar{x}}^\circ$ of the aircraft;

an indicator 18 representative of the potential vertical speed $h^\circ_T$ of the aircraft, movable around the dial and whose position in relation to the needle 17 indicates instantaneously the acceleration on the trajectory of the aircraft, and possibly;

an indication by digital display of the slope of the aircraft (digital display 19).

In a more precise manner, in the case where the aircraft is equipped with an inertial guidance unit or its equivalent, the instantaneous vertical speed of the aircraft supplied by the needle 17 of the improved variometer can be calculated by means of a calculator solving the equation:

$$h\vec{\bar{x}}^\circ = \frac{h^\circ A}{1 + \tau'_1 s} \times \frac{1 + (\tau'_1 + \tau'_2)s}{1 + \tau'_2 s} +$$

$$\frac{\tau'_1}{1 + \tau'_1 s} \times \frac{\tau'_2 s}{1 + \tau'_5 s}(j_z - g)$$

$j_z$ being the vertical component of the acceleration of the aircraft, g being the acceleration of gravity, $h^\circ A$ being a signal of vertical speed possibly coming from a central anemometric unit.

$\tau'_1$ and $\tau'_2$ being constants of time.

Moreover, the potential vertical speed $h^\circ_T$ of the aircraft is obtained from the following formula:

$$h^\circ_T = h\vec{\bar{x}}^\circ +$$

$$\frac{1}{g}\left(\frac{1}{1 + \tau'_3 s} \times \frac{dVa}{dt} + \frac{\tau'_3 s}{1 + \tau'_3 s}\frac{dVx}{dt}\right) \times \frac{Vx}{1 + \tau_4 s}$$

in which:

Va is the air speed,

Vx is the anemometric speed, $\tau'_3$ is a constant of time, for example on the order of ten seconds, $\tau_4$ is a constant of time, for example on the order of three seconds.

In the case where the aircraft is not equipped with a central inertial unit, the instantaneous vertical speed of the aircraft supplied by the needle 17 of the improved variometer can be calculated by means of a calculator solving the equation:

$$h\vec{\bar{x}}^\circ = \frac{h^\circ A}{1 + \tau'_1 s} \times \frac{1 + (\tau'_1 + \tau'_2)s}{1 + \tau'_2 s} +$$

$$\frac{\tau'_1}{1 + \tau'_1 s} \times \frac{\tau'_2 s}{1 + \tau'_2 s}(j_{z1} - g\cos\phi)$$

$j_{z1}$ being the vertical component of the acceleration on the vertical axis connected to the aircraft.

$\phi$ being the angle of roll of the aircraft, $\tau'_1$ and $\tau'_2$ being constants of time.

Moreover the potential vertical speed $h^\circ_T$ of the aircraft is obtained from the following formula:

$$h^\circ_T = h\vec{\bar{x}}^\circ + \frac{1}{g}V_H\left(\frac{dV\vec{\bar{x}}}{dt}\right)\left(\frac{1}{1 + \tau'_4 s}\right)$$

in which:

I—$hx^\circ$ is the instantaneous vertical speed of the aircraft (which is obtained as previously indicated).

II—$V_H$ is a composite speed which has for its expression:

$$V_H = \frac{TAS}{1 + \tau''_1 s} \times \frac{1 + (\tau''_1 + \tau''_2)s}{1 + \tau''_2 s} +$$

$$\frac{\tau''_1}{1 + \tau''_1 s} \times \frac{\tau''_2 s}{1 + \tau''_2 s}(j_{x1} - g\sin\sigma)$$

The expression TAS designating the true speed of the aircraft, $\tau''_1$ and $\tau''_2$ being constants of time, $\theta$ being the longitudinal position of the aircraft, $j_{x1}$ being the component of the acceleration on the longitudinal axis of the aircraft, s being the Laplace operator, III—$dV\vec{x}/dt$ is the derivative of the true speed of the aircraft mixed with the longitudinal acceleration compensated for gravity, this derivative having for its expression:

$$\frac{dV\vec{x}}{dt} = \frac{\tau''_3 s}{1 + \tau''_3 s} (j_{x1} - g \sin \sigma) + \frac{s}{1 + \tau''_3 s} TAS$$

in which $\tau''_3$ is a constant of time.

Figure 3:
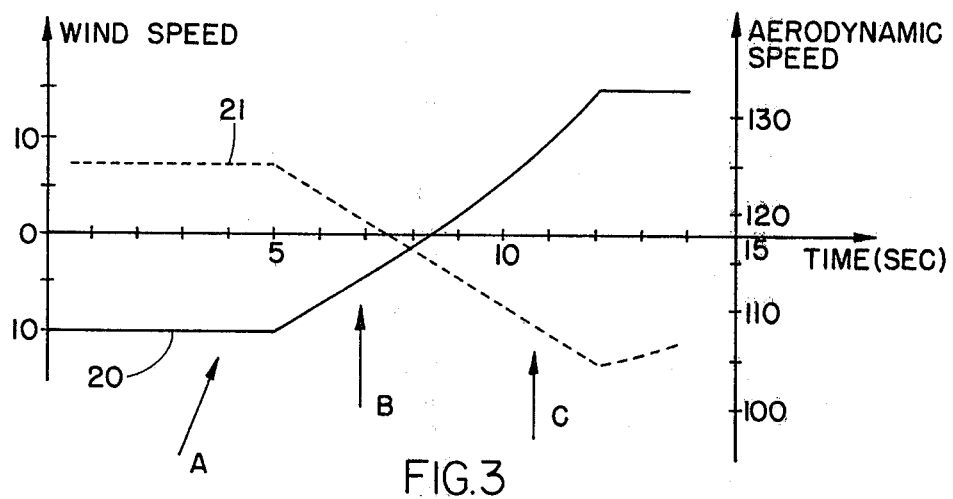
FIG. 3 is a diagram representing the variations of the wind speed, and of the aerodynamic speed of the aircraft, as a function of time, during a period when a wind gradient is produced.

The interest of such an arrangement follows clearly from FIGS. 4, 5 and 6 in which the indications of the variometer correspond to the three phases of the diagram of FIG. 3 in which are represented the curves of the wind speed (curve 20) and of the aerodynamic speed (curve 21) of the aircraft in function of time, during a period when a wind gradient is produced.

In the first phase (arrow A and FIG. 4), which correspond to a normal flight, the needle 17 of the variometer is now aligned with the indicator 18, so that the acceleration of the aircraft on its trajectory is substantially constant.

The second phase (arrow B and FIG. 5) correspond at the beginning from the wind gradient. In this phase, the luminous signal 12 lights up and a difference between the needle 17 and the indicator 18 is produced indicating a deceleration of the aircraft on its trajectory.

This difference increases in the third phase (arrow C, FIG. 6), while the forward speed of the aircraft, indicated by the needle 17 increases.

The pilot whose eye has been attracted by the lighting up of the luminous signal, is instantaneously informed of the maneuverings that he must effect and which consist in:

exercising control over the joystick in order to correct the excessive vertical forward speed of the aircraft, and to increase the throttle in order to compensate for the deceleration of the plane.

I claim:

1. An arrangement for the rapid detection of a wind gradient, in which a signal representative of a magnitude A, is furnished by a circuit means for solving the equation:

$$(\gamma_T - \gamma_a) g - s \left( \frac{V - V_{sel}}{1 + 0.2s} \right) = A,$$

A is coupled to a first filter coupled to a retifier circuit, coupled to a second filter, then to an amplifier coupled to a summator which receives a signal $\alpha_f$ representative of the incidence $\alpha$ of the aircraft, derived from a detector of incidence $\alpha$ associated with a third filter, the signal $\alpha\vec{x}$ furnished by the said summator being transmitted to a detector means for comparing the signal $\alpha\vec{x}$ to a reference $\alpha_o$ and which generates an alarm signal when $\alpha\vec{x}$ exceeds $\alpha_o$.

2. Arrangement according to claim 1, characterized in that the transfer function of the first filter is in the form $$\frac{\tau_3 s}{1 + \tau_3 s},$$

that of the second filter is $$\frac{1}{1 + \tau_4 s}$$

and that of the third filter is $$\frac{1}{1 + \tau_2 s},$$

the value of $\tau_2$ and $\tau_4$ being substantially three seconds and the value of $\tau_3$ being substantially ten seconds.

3. Arrangement according to claim 2, including means for obtaining the magnitude A by taking the derivative in relation to time of the difference between the air-speed V and the ground-speed $V_x$, and the said first filter is suppressed.

4. An arrangement according to claim 1 or 2 or 3 comprising a variometer for an airplane having a luminous indicator thereon which is responsive to said alarm signal which commands the lighting up of said luminous indicator said variometer having a dial and a moveable indicator needle for indicating the instantaneous vertical speed $h\hat{x}°$ of the aircraft, and an indicator, moveable around said dial, for indicating the potential vertical speed $h°_T$ and a digital display for displaying the slope of the airplane.

* * * * *